(12) United States Patent
Jeong et al.

(10) Patent No.: US 9,664,939 B2
(45) Date of Patent: May 30, 2017

(54) DISPLAY APPARATUS

(71) Applicant: Samsung Display Co., Ltd., Yongin-si (KR)

(72) Inventors: Changoh Jeong, Suwon-si (KR);
Kyungseop Kim, Hwaseong-si (KR);
Byeong-Beom Kim, Asan-si (KR);
Sangwon Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 29 days.

(21) Appl. No.: 14/930,184

(22) Filed: Nov. 2, 2015

(65) Prior Publication Data
US 2016/0133198 A1 May 12, 2016

(30) Foreign Application Priority Data
Nov. 12, 2014 (KR) ........................ 10-2014-0157423

(51) Int. Cl.
G09G 3/34 (2006.01)
G02F 1/1335 (2006.01)
G09G 3/36 (2006.01)
G02F 1/1362 (2006.01)

(52) U.S. Cl.
CPC ......... *G02F 1/133502* (2013.01); *G09G 3/36* (2013.01); *G02F 2001/13629* (2013.01); *G02F 2001/136295* (2013.01)

(58) Field of Classification Search
CPC .................. G09F 3/36; G02F 1/133502; G02F 2001/13629; G02F 2001/136295; G09G 2300/04
See application file for complete search history.

(56) References Cited

U.S. PATENT DOCUMENTS

| 9,324,972 | B2* | 4/2016 | Yang | H01L 27/3244 |
| 2011/0149178 | A1* | 6/2011 | Uno | G02F 1/136259 348/790 |
| 2014/0354923 | A1 | 12/2014 | Lee et al. | |
| 2016/0077389 | A1* | 3/2016 | Takeda | G02F 1/133512 349/43 |

FOREIGN PATENT DOCUMENTS

| KR | 10-2007-0000247 | 1/2007 |
| KR | 10-2012-0081764 | 7/2012 |
| KR | 10-2013-0066410 | 6/2013 |
| KR | 10-2014-0140181 | 12/2014 |

* cited by examiner

*Primary Examiner* — Lixi C Simpson
(74) *Attorney, Agent, or Firm* — H.C. Park & Associates, PLC

(57) ABSTRACT

A display panel includes: a backlight assembly emitting light; and a display panel receiving the light to display an image. The display panel includes: a display substrate; a counter substrate; and an anti-reflective film. The display panel includes: a plurality of pixels; signal lines electrically connected to the plurality of pixels; and an anti-reflective layer disposed on the signal lines to reduce an amount of the light reflected from the signal lines. The counter substrate is coupled with the display substrate, and is disposed between the display substrate and the backlight assembly. The anti-reflective layer includes a plurality of auxiliary layers laminated to each other, the plurality of auxiliary layers have different refractive indexes, and one of the plurality of auxiliary layers includes aluminum zinc tin oxide (AZTO).

17 Claims, 5 Drawing Sheets

DISPLAY APPARATUS

CROSS REFERENCE TO RELATED APPLICATIONS

This application claims priority from and the benefit of Korean Patent Application No. 10-2014-0157423, filed Nov. 12, 2014, which is hereby incorporated by reference for all purposes as if fully set forth herein.

BACKGROUND

Field

Exemplary embodiments relate to a display apparatus.

Discussion of the Background

A display apparatus including a display panel that does not generate light by itself, such as a liquid crystal display (LCD) apparatus, typically includes a backlight assembly. An image is displayed using light emitted from the backlight assembly.

The display panel may include a display substrate on which a plurality of pixels are formed, and a counter substrate facing the display substrate. The display substrate typically includes a plurality of pixels, a plurality of interconnection lines, and a plurality of thin film transistors. The plurality of interconnection lines may be electrically connected to the plurality of pixels and may transmit signals driving the plurality of pixels and various signals. The plurality of thin film transistors may be electrically connected to the plurality of pixels and the plurality of lines.

The backlight assembly may emit light toward the display panel. The backlight assembly may overlap the display panel, and the display substrate of the display panel may be typically disposed closer to the backlight assembly than the counter substrate. However, in some applications the counter substrate may be disposed closer to the backlight assembly than the display substrate.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus.

Exemplary embodiments provide a display apparatus including a backlight assembly to emit light, and a display panel receiving the light to display an image.

Additional aspects will be set forth in the detailed description which follows, and, in part, will be apparent from the disclosure, or may be learned by practice of the inventive concept.

An exemplary embodiment discloses a display substrate including a counter substrate, and an anti-reflective film. The display apparatus includes a backlight assembly emitting light, and a display panel receiving the light to display an image. The display panel includes a plurality of pixels, signal lines electrically connected to the plurality of pixels, and an anti-reflective layer disposed on the signal lines to reduce an amount of light reflected from the signal lines. The counter substrate is coupled with the display substrate and is disposed between the display substrate and the backlight assembly. The anti-reflective layer includes a plurality of auxiliary layers laminated to each other, the plurality of auxiliary layers have different refractive indexes, and one of the plurality of auxiliary layers include aluminum zinc tin oxide (AZTO).

An exemplary embodiment also discloses a display panel including a display substrate, a counter substrate, and an anti-reflective film. The display panel includes a plurality of pixels, signal lines electrically connected to the plurality of pixels, and an anti-reflective layer disposed on the signal lines to reduce an amount of light reflected from the signal lines. The counter substrate is coupled with the display substrate and disposed between the display substrate and the backlight assembly. The anti-reflective layer includes a plurality of auxiliary layers laminated to each other, the plurality of auxiliary layers has different refractive indexes, and one of the plurality of auxiliary layers includes a metal oxide having Gibbs free energy lower than that of indium oxide.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
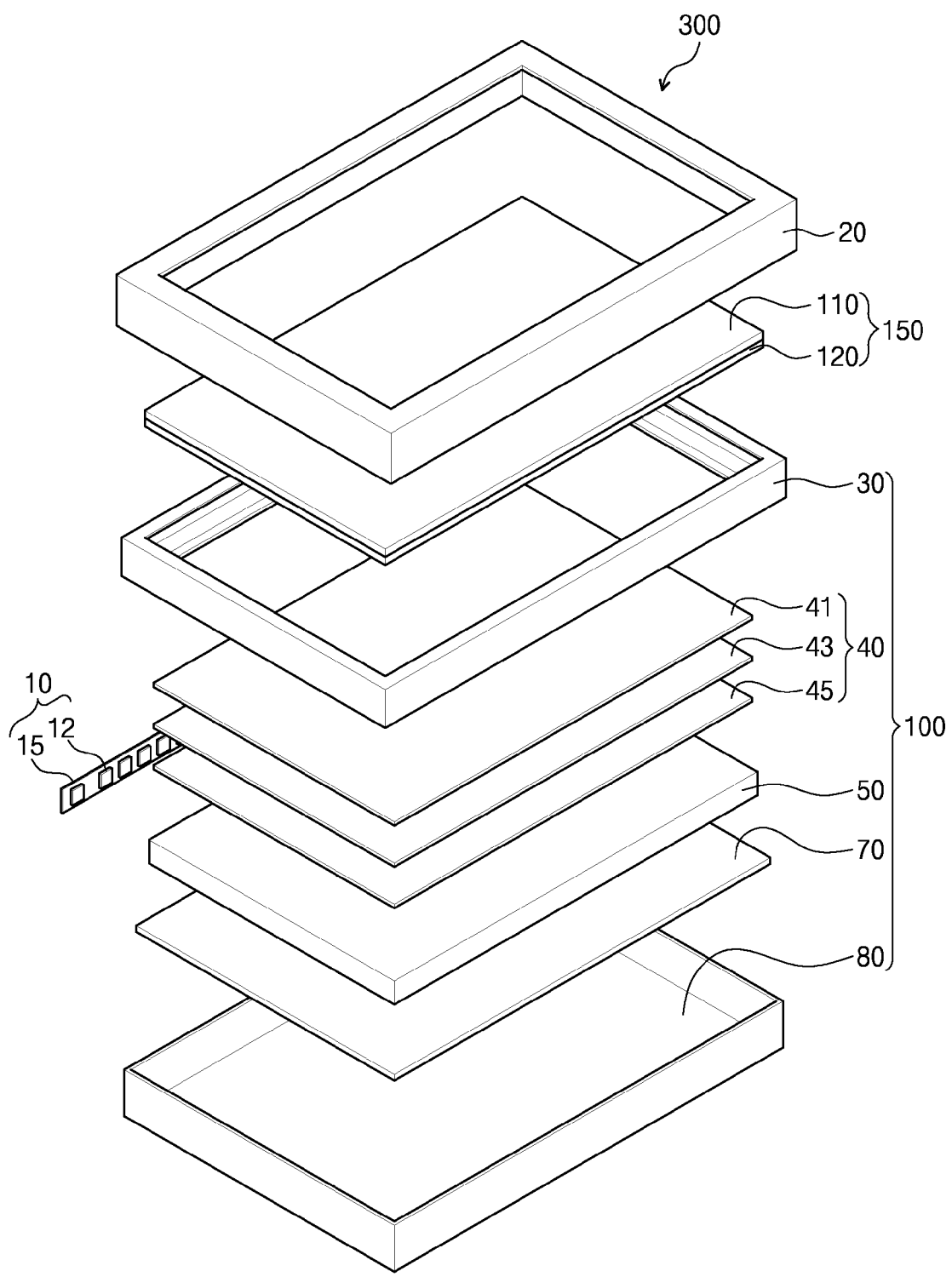
FIG. 1 is an exploded perspective view of a display apparatus according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is an exploded perspective view of a display apparatus according to an embodiment.

Referring to FIG. 1, a display apparatus 300 includes a backlight assembly 100 and a display panel 150.

The display panel 150 overlaps the backlight assembly 100 and may display an image. The display panel 150 receives light from the backlight assembly 100 to display an image. According to an exemplary embodiment, the display panel 150 may be, for example, a liquid crystal display panel.

The backlight assembly 100 may emit light toward the display panel 150. Exemplary embodiments are s not limited to the described structure of the backlight assembly 100, but, for the sake of simplicity, exemplary embodiments will be described according to the example of the structure of the backlight assembly 100 shown in FIG. 1.

The backlight assembly 100 may include a receiving container 80, a light emitting unit 10, a reflection member 70, a light guide plate 50, a mold frame 30, a plurality of sheets 40, and a cover member 20.

The receiving container 80 includes a bottom part and side walls extending from the bottom part to form a receiving space. The light emitting unit 10 is disposed in the receiving space, and is configured to generate light. In the exemplary embodiment shown in FIG. 1, the light emitting unit 10 includes a printed circuit board 15 and a plurality of light-emitting diode packages 12 mounted on the printed circuit board 15. The light emitting unit 10 is disposed to face one side surface of the light guide plate 50.

The light guide plate 50 is disposed in the receiving space of the receiving container 80. The light emitted from the light emitting unit 10 may be incident into the light guide plate 50 and may be guided toward the display panel 150 by the light guide plate 50. The reflection member 70 may include a material that reflects light, such as aluminum, and is disposed between the bottom part of the receiving container 80 and the light guide plate 50.

The plurality of sheets 40 are disposed between the light guide panel 50 and the display panel 150. According to an exemplary embodiment, the plurality of sheets 40 may include a protective sheet 41, a prism sheet 43, and a diffusion sheet 45. The protective sheet 41 may have non-optical properties and may protect a rear surface of the display panel 150. The prism sheet 43 may improve front luminance of the display panel 150, and the diffusion sheet 45 may diffuse light guided toward the display panel 150 by the light guide panel 50.

The mold frame 30 is coupled with the receiving container 80 to support edges of the light guide panel 50 and the plurality of sheets 40. The cover member 20 has a partially opened shape and may expose a display area of the display panel 150. The cover member 20 is coupled with the receiving container 80 and covers the edges of the display panel 150.

Figure 2:
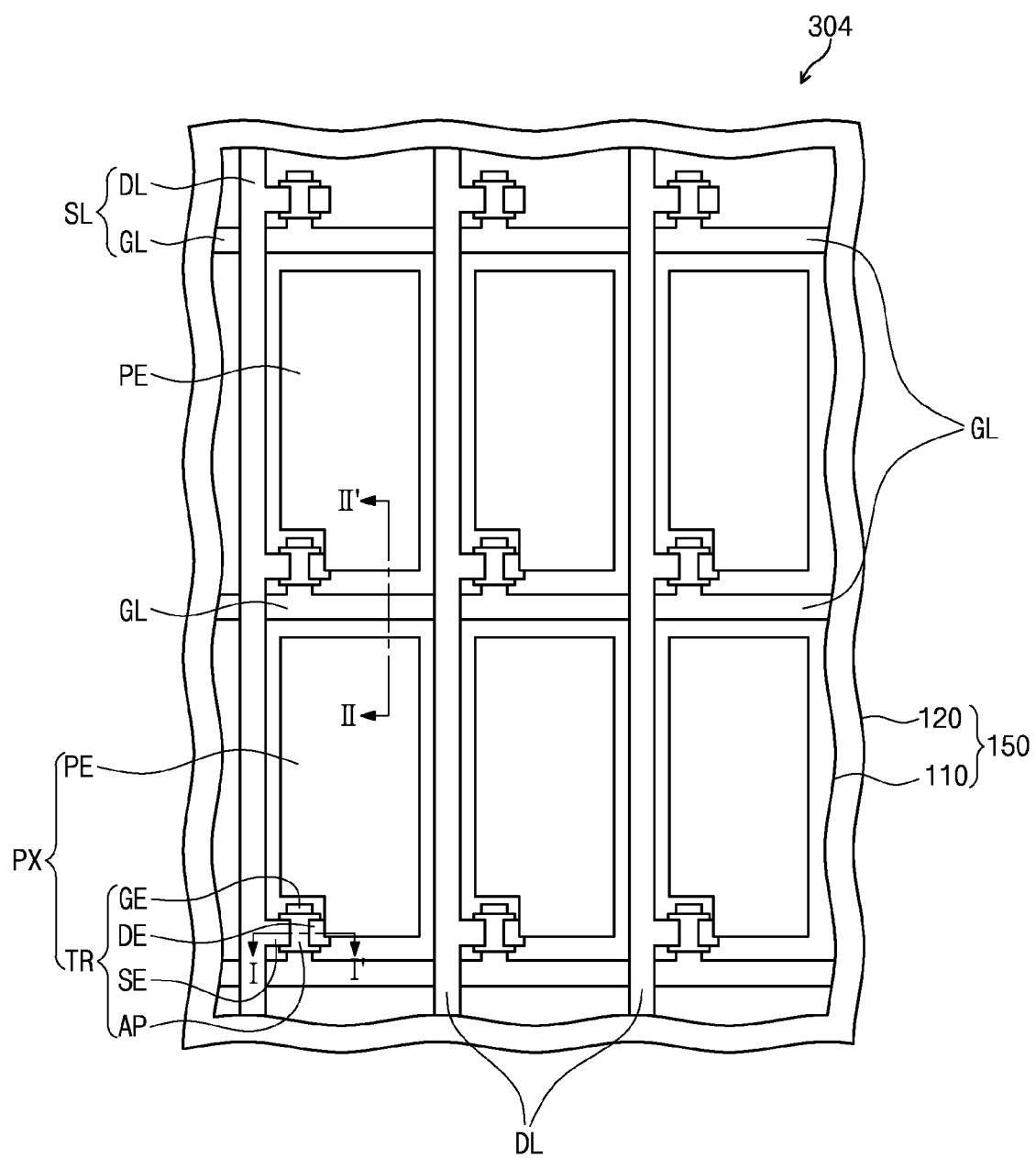
FIG. 2 is a plan view illustrating pixels of the display panel illustrated in FIG. 1.
Figure 3:
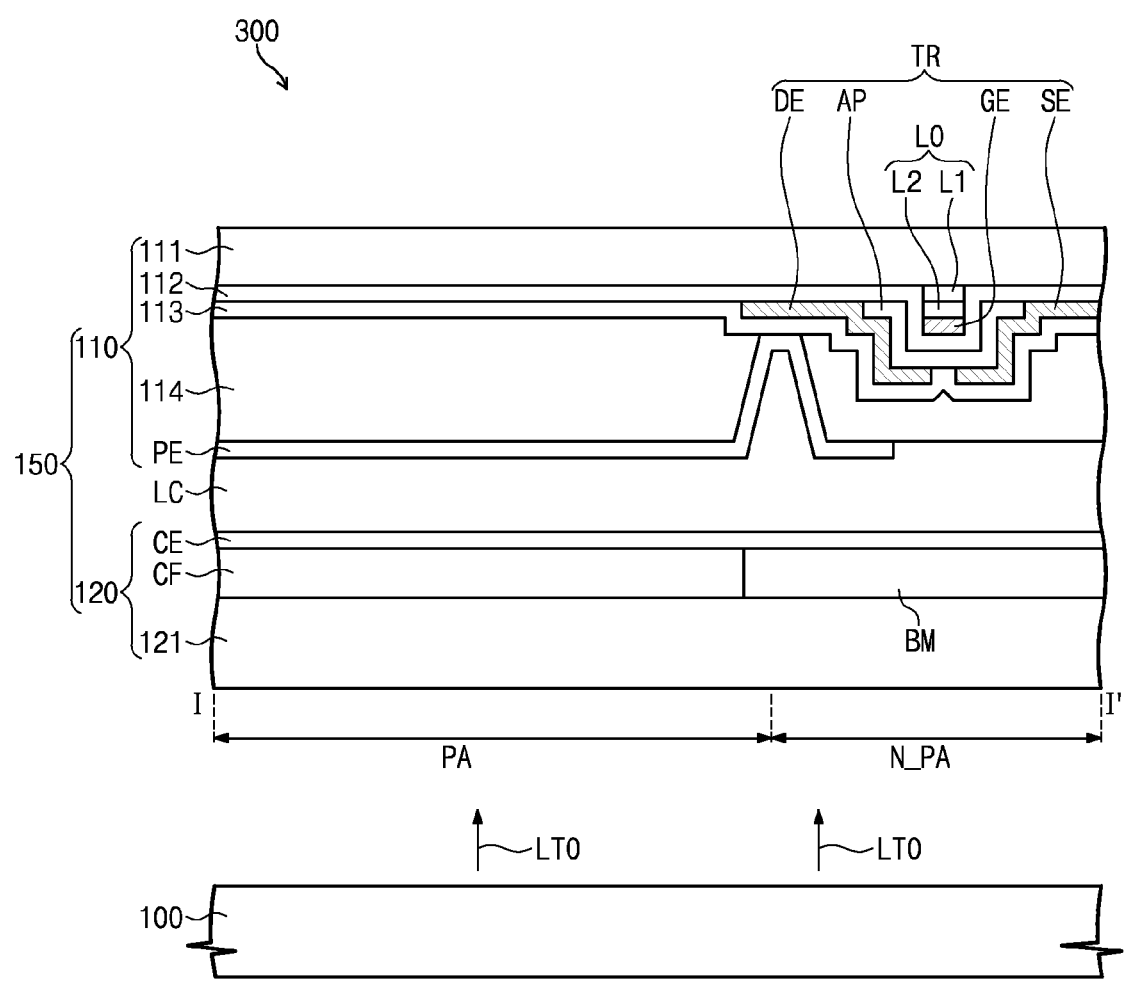
FIG. 3 is a sectional view taken along sectional line I-I' of FIG. 2.
Figure 4:
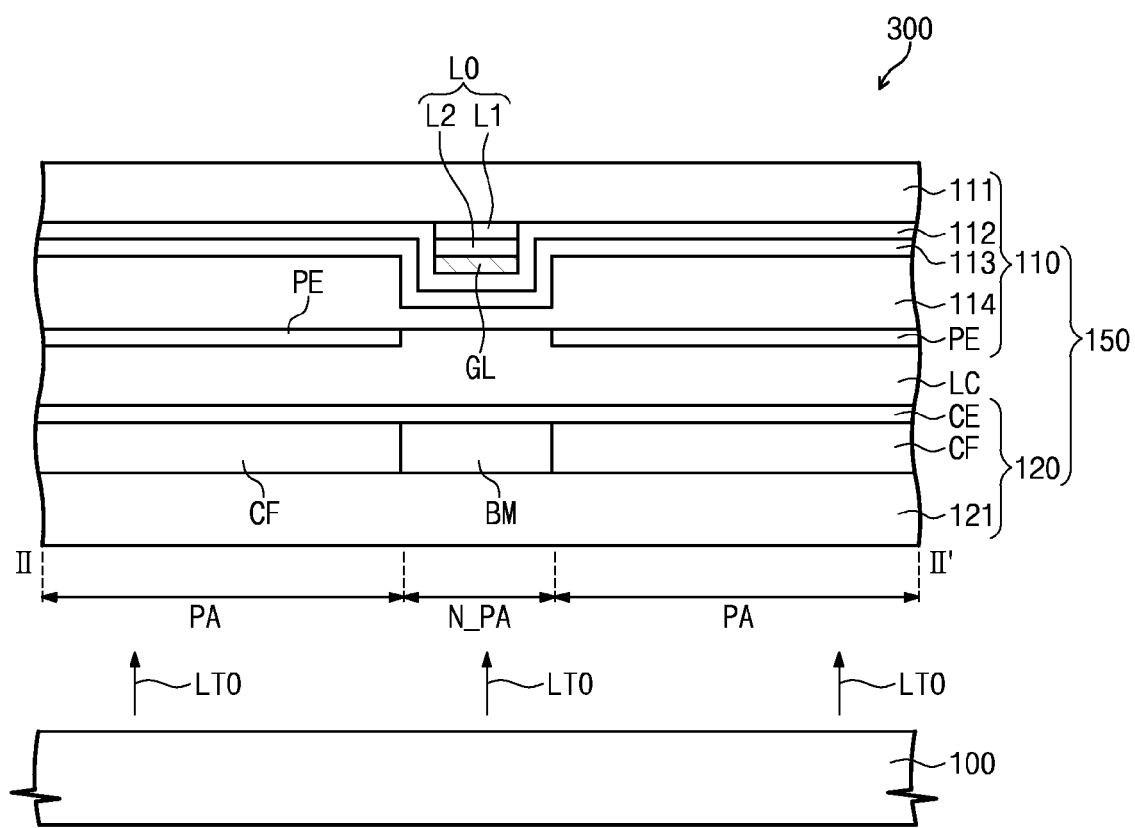
FIG. 4 is a sectional view taken along sectional line II-II' of FIG. 2.

FIG. 2 is a plan view illustrating pixels of the display panel illustrated in FIG. 1, and FIG. 3 is a cross-sectional view taken along line I-I' of FIG. 2, and FIG. 4 is a cross-sectional view taken along line II-II' of FIG. 2.

Referring to FIGS. 2, 3, and 4, the display panel 150 includes a display substrate 110, a counter substrate 120, and a liquid crystal layer LC. The counter substrate 120 is coupled with the display substrate 110 and faces the display substrate 110. The liquid crystal layer LC is interposed between the display substrate 110 and the counter substrate 120. Accordingly, light LT0 emitted from the backlight assembly 100 may be emitted from the display panel 150 after sequentially passing through the counter substrate 120, the liquid crystal layer LC and the display substrate 110.

The display substrate 110 includes a first base substrate 111, a plurality of signal lines SL, a plurality of pixels PX, and an anti-reflective layer L0. The first base substrate 111 may be a light transmitting substrate, such as a glass substrate and/or a plastic substrate.

The plurality of signal lines SL is electrically connected to the plurality of pixels PX to transmit a driving signal to drive the plurality of pixels PX. According to an exemplary embodiment, the plurality of signal lines SL may include a plurality of gate lines GL and a plurality of data lines DL. Hereinafter, for simplicity, one gate line GL and one data line DL among the plurality of gate lines GL and the plurality of data lines DL will be described as an example.

The gate line GL may be disposed on the first base substrate 111, and the data line DL is disposed on the first base substrate 111 and is insulated from the gate line GL by the gate insulating film 112. According to an exemplary embodiment, the gate line GL may be perpendicular to the data line DL on a plane, and the gate line may include copper.

The plurality of pixels PX is disposed on the first base substrate 111, and each of the plurality of pixels PX includes a thin film transistor TR and a pixel electrode PE. The thin-film transistor TR is located in a non-pixel area N_PA, and the pixel electrode PE is at least partially located in a pixel area PA.

The thin-film transistor TR may include a gate electrode GE, an active pattern AP, a source electrode SE, and a drain electrode DE. The gate electrode GE is electrically connected to the gate line GL, and the active pattern AP is disposed on the gate electrode GE with the gate insulating film 112 disposed therebetween. The source electrode SE is electrically connected to the data line DL and is disposed on the active pattern AP, and the drain electrode DE is disposed on the active pattern AP to be spaced apart from the source electrode SE.

According to an exemplary embodiment, the active pattern AP may include amorphous silicon or polycrystalline silicon. However, exemplary embodiments are not limited thereto. For example, the active pattern AP may include an oxide semiconductor such as IGZO, ZnO, $SnO_2$, $In_2O_3$, $Zn_2SnO_4$, $Ge_2O_3$, and/or $HfO_2$.

The pixel electrode PE is disposed on an inorganic insulating film 113 and an organic insulating film 114 covering the thin film transistor TR. Further, the pixel electrode PE contacts the drain electrode DE through a contact hole penetrating the inorganic insulating film 113 and the organic insulating film 114.

The counter substrate 120 may include a second base substrate 121, a common electrode CE, a light shielding layer BM, and a color filter CF. The second base substrate 121 may be a transparent substrate, such as a glass substrate or a plastic substrate. The common electrode CE is disposed on the second base substrate 121 to form an electric field together with the pixel electrode PE for orienting liquid crystal molecules of the liquid crystal layer LC.

The color filter CF is disposed on the second base substrate 121 to substantially correspond to the pixel area PA. The light shielding layer BM is disposed on the second base substrate 121 to substantially correspond to the non-pixel area N_PA. Thus, the light shielding layer BM may shield the output light LT0 progressing toward the active pattern AP. As a result, switching characteristics of the thin film transistor TR may be prevented from becoming non-uniform by a leakage current due to the output light LT0 incident onto the active pattern AP.

Exemplary embodiments are not limited to the respective structures of the above-mentioned display substrate 110 and the counter substrate 120. For example, the color filter CF may be disposed on the first base substrate 111 substantially overlapping the pixel electrode PE, and the common electrode CE may be disposed on the first base substrate 111 spaced apart from the pixel electrode PE.

The anti-reflective layer L0 reduces an amount of light from outside the device that may be reflected; that is, the light that passes through the first base substrate 111 and then is reflected from the gate line GL and the gate electrode GE.

In an exemplary embodiment, the anti-reflective layer L0 may include a first auxiliary layer L1 and a second auxiliary layer L2. The first auxiliary layer L1 may have a first refractive index, and the second auxiliary layer may have a second refractive index greater than the first refractive index.

The anti-reflective layer L0 may be disposed on the signal lines SL, and in an exemplary embodiment, the anti-reflective layer L0 may also be disposed on the gate lines GL. In further detail, the first auxiliary layer L1 may be disposed between the first base substrate 111 and the second auxiliary layer L2, and the second auxiliary layer L2 may be disposed between the first auxiliary layer L1 and the gate line GL.

As shown in FIG. 4, the anti-reflective layer L0 may be disposed on the gate electrode GE, and the second auxiliary layer L2 of the anti-reflective layer L0 disposed on the gate electrode GE may be disposed between the first auxiliary layer L1 and the gate electrode GE.

In the exemplary embodiment shown in FIG. 4, the first auxiliary layer L1 may be a metal layer. For example, the first auxiliary layer L1 may include at least one of titanium (Ti), tantalum (Ta), and molybdenum (Mo).

In an exemplary embodiment, the second auxiliary layer L2 may include a metal oxide, and the metal oxide may have Gibbs free energy lower than that of an indium oxide, such as indium zinc oxide (ZIO) and $In_2O_3$ (Indium oxide). That is, the metal oxide included in the second auxiliary layer L2 may be an indium-free oxide having a smaller Gibbs free energy than that of the indium oxide.

For example, the second auxiliary layer L2 may include aluminum zinc tin oxide (AZTO), the AZTO being an indium-free oxide and having Gibbs free energy that is smaller than that of the indium oxide.

However, exemplary embodiments are not limited thereto. For example, the second auxiliary layer L2 may include at least one of lithium oxide, beryllium oxide, sodium oxide, magnesium oxide, calcium oxide, scandium oxide, titanium oxide, vanadium oxide, manganese oxide, iron oxide, cobalt oxide, nickel oxide, zinc oxide, rubidium oxide, strontium oxide, yttrium oxide, zirconium oxide, niobium oxide, molybdenum oxide, technetium oxide, ruthenium oxide, rhodium oxide, palladium oxide, tin oxide, antimony oxide, cesium oxide, barium oxide, lanthanum oxide, hafnium oxide, tantalum oxide, tungsten oxide, rhenium oxide, osmium oxide, iridium oxide, and platinum oxide.

Advantages of the second auxiliary layer L2 having the above-described material characteristics will now be explained. According to exemplary embodiments, in a manufacturing method of the anti-reflective layer L0, the anti-reflective layer L0 may be patterned together with the gate line GL. In this case, a material included in the gate line GL may be etched at a first etching rate by an etching material and a material included in the anti-reflective layer L0 may be etched at a second etching rate by the etching material. The smaller the difference between the first and second etching rates, the easier the patterning process of the anti-reflective layer L0 and the gate line GL. For example, when the second etching rate is greater than the first etching rate, while the gate line GL is patterned by the etching material, an "undercut," may occur. An undercut is a phenomenon in which the anti-reflective layer L0 is over etched and thus, a portion of the anti-reflective layer L0 located under the gate line GL is etched.

According to an exemplary embodiment, when the gate line GL includes copper, the first auxiliary layer L1 includes titanium, and the second auxiliary layer L2 includes aluminum zinc tin oxide, the etching material may include ammonium persulfate to reduce a difference between the first etching rate and the second etching rate.

According to an exemplary embodiment, the amount of aluminum oxide in the aluminum zinc tin oxide included in the second auxiliary layer L2 may range from about 1 wt % to about 10 wt %, and the amount of tin oxide may range from about 20 wt % to about 40 wt %. Further, the amount of zinc oxide in the aluminum zinc tin oxide is the remainder except for the aluminum oxide and the tin oxide from the aluminum zinc tin oxide, the remainder ranging from about 40 wt % to about 79 wt %.

In a comparative example, when the amount of aluminum oxide is less than about 1 wt % or the amount of tin oxide is less than about 20 wt % in the aluminum zinc tin oxide, the second etching rate becomes faster than the first etching rate so that the difference between the first and second etching rate may increase. In another comparative example, when the amount of aluminum oxide is more than about 10 wt % or the amount of tin oxide is more than about 40 wt % in the aluminum zinc tin oxide, the first etching rate becomes faster than the second etching rate so that the difference between the first and second etching rate may increase.

Advantages of having metal oxide included in the second auxiliary layer L2 having a Gibbs free energy smaller than that of the indium oxide are now described.

In a comparative example, when indium oxide is included in the second auxiliary layer L2, the indium oxide is combined with oxygen generated during a manufacturing process of the display substrate 110 so that indium in the indium oxide may be reduced. Thus, a vacancy may be generated in the second auxiliary layer L2 by the indium reduced from the indium oxide. When the vacancy is generated in the second auxiliary layer L2, reflectance of the anti-reflective layer L0 may be increased.

However, according to an exemplary embodiment, since the second auxiliary layer L2 has Gibbs free energy lower than that of the indium oxide to include a chemically stable metal oxide, a vacancy may be prevented from being generated in the second auxiliary layer L2 as a metal of the second auxiliary layer L2 is reduced. Accordingly, reflectance of the anti-reflective layer L0 may be prevented from increasing by the vacancy.

The following table shows reflectance of external light (ET of FIG. 5) changing according to material characteristics of the first auxiliary layer L1, the second auxiliary layer L2, and the gate line GL of Comparative examples and an Example of the inventive concept. For reference, the reflectance is a ratio of an amount of light reflected from the gate line GL to an amount of light provided form outside and incident onto the gate line GL.

TABLE 1

| Material characteristic (first auxiliary layer/ second auxiliary layer/ gate line) | Reflectance | | | | |
|---|---|---|---|---|---|
| | Wavelength of external light = 450 nm | Wavelength of external light = 550 nm | Wavelength of external light = 650 nm | Average | Remark |
| Ti/IZO/Cu | 9.24% | 8.67% | 5.22% | 8.23% | Comparative example |
| Ti/ZIO/Cu | 9.78% | 8.17% | 4.64% | 9.49% | Comparative example |
| Ti/AZTO/Cu | 8.79% | 10.87% | 5.11% | 6.70% | Example |

As shown in the comparative examples of Table 1, when the second auxiliary layer L2 includes an indium oxide such as IZO or ZIO, the reflectance of external light having a wavelength ranging from about 450 nm to about 650 nm ranges from about 8.23% to about 9.49%. However, in the exemplary embodiment ("Example") shown in Table 1, when the second auxiliary layer L2 includes AZTO, the reflectance of the external light having the wavelength ranging from about 450 nm to about 650 nm is about 6.70%.

Thus, as shown in the exemplary embodiment in Table 1 ("Example"), when a non-indium oxide, such as AZTO, having Gibbs free energy lower than that of the indium oxide is selected as a material for the second auxiliary layer L2, the reflectance is reduced, and accordingly the display quality of the display panel 150 can be prevented from being reduced by the external light reflected from the gate line GL.

According to exemplary embodiments, the thickness of the first auxiliary layer L1 and the thickness of the second auxiliary layer L2 are defined by the following mathematical equation ("Mathematical Equation").

$$(d1+d2) \approx \{(\lambda/4) \times (1/n_1)\} + \{(\lambda/4) \times (1/n_2)\} \quad \text{Mathematical Equation}$$

d1 is a thickness of the first auxiliary layer L1
d2 is a thickness of the second auxiliary layer L2
$n_1$ is a refractive index of the first auxiliary layer
$n_2$ is a refractive index of the second auxiliary layer
$\lambda$ is a wavelength of external light (ET of FIG. 5) provided from outside and transmitting through the first base substrate 111.

When the thicknesses of the first and second auxiliary layer L1, L2 satisfy the Mathematical Equation, destructive interference may be generated between a portion of the external light reflected from the gate line GL and another portion of the external light reflected from the first and second auxiliary layers L1 and L2. Accordingly, the anti-reflective layer L0 may reduce the amount of light reflected from the gate line GL. In other words, when refractive indexes and thicknesses of the first and second auxiliary layers L1 and L2 are adjusted, the wavelength of the external light absorbed by the anti-reflective layer L0 may be controlled. This is described in more detail with reference to FIG. 5.

Figure 5:
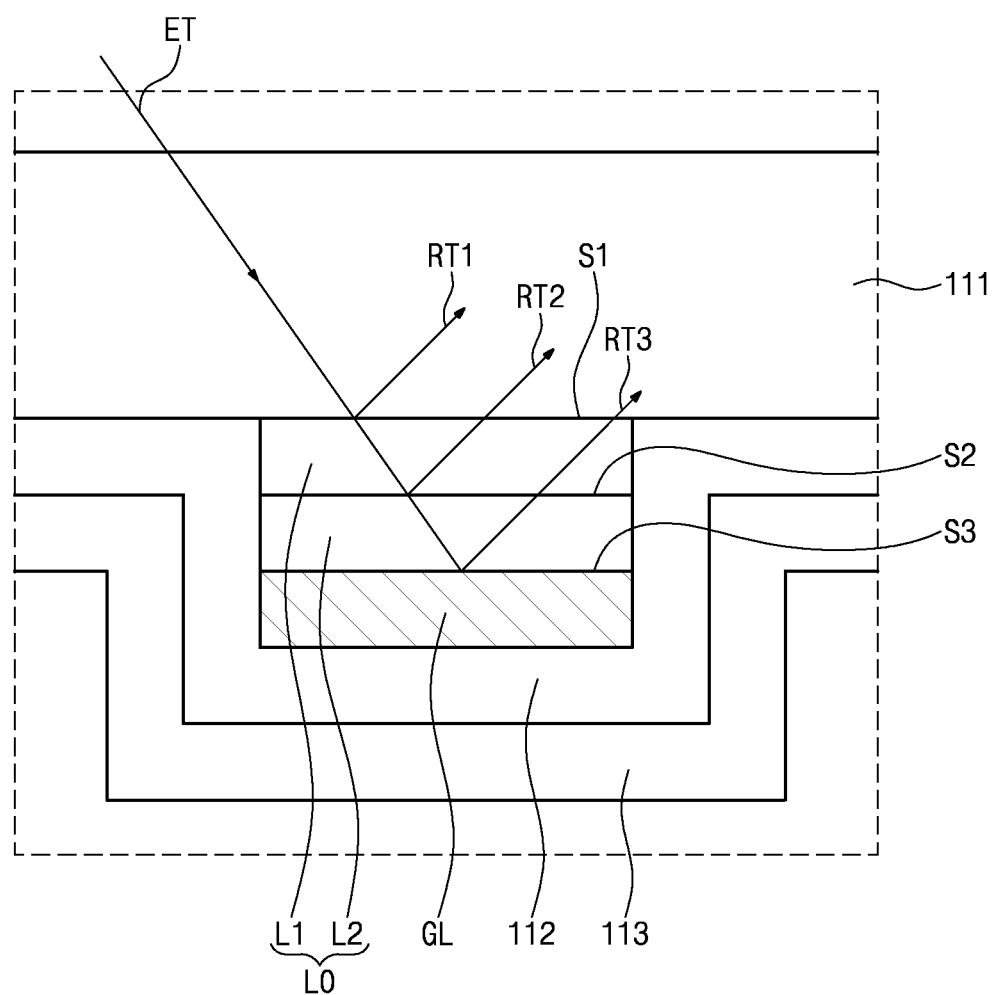
FIG. 5 is an enlarged view of a portion of the display substrate illustrated in FIG. 4.

FIG. 5 is an enlarged view of a portion of a display substrate 110 illustrated in FIG. 4, and more particularly, shows detailed views of the first base substrate, the anti-reflective layer and the gate line.

Referring to FIG. 5, when the external light ET is provided toward the display substrate 110, a portion of the external light ET passes through the first base substrate 111. After that, a portion of the external light ET is reflected by a first surface S1 of the first auxiliary layer L1 to generate a first reflected light RT1. Another portion of the external light ET passes through the first auxiliary layer L1 and is reflected by a second surface S2 between the first auxiliary layer L1 and the second auxiliary layer L2, thus generating a second reflected light RT2. Another portion of the external light ET passes through the second auxiliary layer L2 and is reflected by a third surface S3, which is a surface of the gate line GL, thus generating a third reflected light RT3.

Although the first to third reflected lights RT1, RT2, and RT3 may be mixed with light used for displaying an image by the display panel 150 to act as a factor to reduce the contrast ratio of the image, when the thicknesses and the refractive indexes of the respective first and second auxiliary layers L1 and L2 are set to satisfy the above-described Mathematical Equation according to an exemplary embodiment, destructive interference may be generated between the third reflected light RT3 and at least one of the first and second reflected lights RT1 and RT2.

Therefore, the amount of light reflected by the gate line GL may be reduced by the anti-reflective layer L0, and accordingly the contrast ratio of an image may be improved.

According to another exemplary embodiment, metal layers including a same material as the gate electrode GE and the gate line GL may be disposed between the first base substrate 111 and the gate insulating film 112. For example, an electrode of a storage capacitor overlapping the pixel electrode PE to charge the pixel electrode PE may be disposed between the first base substrate 111 and the gate insulating film 112. In this case, the anti-reflective layer L0 may be disposed between the first base substrate 111 and the electrode of the storage capacitor. Therefore, the anti-reflective layer L0 may further reduce the amount of external light ET reflected from the electrode of the storage capacitor.

According to exemplary embodiments, an anti-reflective layer may reduce an amount of a portion of external light which is reflected from signal lines of a display panel. Therefore, since light for displaying an image and the reflected light are mixed in the display panel, display quality of the image may be prevented from be reduced.

Since the anti-reflective layer may reduce an amount of the reflected light by using destructive interference between the light reflected from the anti-reflective layer and the light reflected from the signal lines of the display panel, the amount of reflected light in a wavelength range may be reduced by adjusting the refractive index and thickness of the anti-reflective film.

The auxiliary layer of the anti-reflective layer may include a metal oxide having Gibbs free energy lower than that of an indium oxide. Accordingly, metal of the auxiliary layer is reduced in a process of manufacturing a display substrate to prevent vacancies from being generated in the auxiliary layer, and as a result, reflectance of the anti-reflective layer may be prevented from being increased due to the vacancies.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus, comprising:
a backlight assembly configured to emit light; and
a display panel overlapping the backlight assembly and configured to receive the light from the backlight assembly to display an image,
wherein the display panel comprises:
a display substrate comprising:
pixels;
signal lines electrically connected to the pixels; and
an anti-reflective layer disposed on the signal lines and configured to reduce an amount of the light reflected from the signal lines; and
a counter substrate coupled with the display substrate and disposed between the display substrate and the backlight assembly,
wherein the anti-reflective layer comprises auxiliary layers laminated to each other,
wherein the auxiliary layers have different refractive indexes, and
wherein one of the auxiliary layers comprises aluminum zinc tin oxide (AZTO).

2. The display apparatus of claim 1, wherein the signal lines comprise gate lines configured to transmit gate signals to the pixels.

3. The display apparatus of claim 2, wherein the gate lines comprise copper.

4. The display apparatus of claim 2, wherein the display substrate further comprises a first substrate having a light transmittance, and the anti-reflective layer is disposed between the signal lines and the first substrate.

5. The display apparatus of claim 4, wherein the auxiliary layers comprise:
a first auxiliary layer disposed on the first substrate and having a first refractive index; and
a second auxiliary layer having a second refractive index greater than the first refractive index, and disposed between each of the gate lines and the first auxiliary layer.

6. The display apparatus of claim 5, wherein:
destructive interference is configured to be generated between light passing through the first substrate that is reflected from the gate lines and light passing through the first substrate that is reflected from the first and second auxiliary layers; and
the anti-reflective layer is configured to use the destructive interference to reduce an amount of the reflected light.

7. The display apparatus of claim 5, wherein the first auxiliary layer comprises at least one of titanium, tantalum, and molybdenum.

8. The display apparatus of claim 5, wherein a thickness of the first auxiliary layer and a thickness of the second auxiliary layer are defined by the following Mathematical Equation, $$(d1+d2) \approx \{(\lambda/4) \times (1/n_1)\} + \{(\lambda/4) \times (1/n_2)\} \quad \text{Mathematical Equation}$$

wherein d1 is the thickness of the first auxiliary layer, d2 is the thickness of the second auxiliary layer, λ is a wavelength of light which passes through the first substrate and is reflected from the gate lines, $n_1$ is a refractive index of the first auxiliary layer, and $n_2$ is a refractive index of the second auxiliary layer.

9. The display apparatus of claim 5, wherein the second auxiliary layer comprises aluminum oxide in an amount ranging from 1 wt % to 10 wt %, tin oxide in an amount ranging from 20 wt % to 40 wt %, zinc oxide in an amount ranging from 40 wt % to 79 wt %.

10. The display apparatus of claim 4, wherein the pixels comprise:
    thin film transistors electrically connected to the signal lines; and
    pixel electrodes electrically connected to the thin film transistors,
    wherein each of the thin film transistors comprises:
        a gate electrode disposed on the first substrate;
        an active pattern overlapping the gate electrode;
        a source electrode disposed on the active pattern; and
        a drain electrode spaced apart from the source electrode and disposed on the active pattern, and
    wherein the anti-reflective layer is disposed between the gate electrode and the first substrate and is configured to reduce an amount of the light reflected from the gate electrode.

11. A display apparatus, comprising:
    a backlight assembly configured to emit light; and
    a display panel overlapping the backlight assembly and configured to receive the light from the backlight assembly to display an image,
    wherein the display panel comprises:
        a display substrate comprising:
            pixels;
            signal lines electrically connected to the pixels; and
            an anti-reflective layer disposed on the signal lines and configured to reduce an amount of the light reflected from the signal lines; and
        a counter substrate coupled with the display substrate, and disposed between the display substrate and the backlight assembly,
    wherein the anti-reflective layer comprises auxiliary layers laminated to each other,
    wherein the auxiliary layers have different refractive indexes, and
    wherein one of the auxiliary layers comprises a metal oxide having Gibbs free energy lower than that of an indium oxide.

12. The display apparatus of claim 11, wherein the signal lines comprise gate lines configured to transmit gate signals to the pixels, and the gate lines comprise copper.

13. The display apparatus of claim 12, wherein:
    the display substrate further comprises a first substrate having a light transmittance; and
    the auxiliary layers comprise:
        a first auxiliary layer disposed on the first substrate and having a first refractive index; and
        a second auxiliary layer having a second refractive index greater than the first refractive index, and disposed between each of the gate lines and the first auxiliary layer.

14. The display apparatus of claim 13, wherein a thickness of the first auxiliary layer and a thickness of the second auxiliary layer are defined by the following Mathematical Equation, $$(d1+d2) \approx \{(\lambda/4) \times (1/n_1)\} + \{(\lambda/4) \times (1/n_2)\} \quad \text{[Mathematical Equation]}$$

wherein d1 is the thickness of the first auxiliary layer, d2 is the thickness of the second auxiliary layer, $\lambda$ is a wavelength of light which passes through the first substrate and is reflected from the gate lines, $n_1$ is a refractive index of the first auxiliary layer, and $n_2$ is a refractive index of the second auxiliary layer.

15. The display apparatus of claim 13, wherein the second auxiliary layer comprises at least one of lithium oxide, beryllium oxide, sodium oxide, magnesium oxide, calcium oxide, scandium oxide, titanium oxide, vanadium oxide, manganese oxide, iron oxide, cobalt oxide, nickel oxide, zinc oxide, rubidium oxide, strontium oxide, yttrium oxide, zirconium oxide, niobium oxide, molybdenum oxide, technetium oxide, ruthenium oxide, rhodium oxide, palladium oxide, tin oxide, antimony oxide, cesium oxide, barium oxide, lanthanum oxide, hafnium oxide, tantalum oxide, tungsten oxide, rhenium oxide, osmium oxide, iridium oxide, and platinum oxide.

16. The display apparatus of claim 13, wherein the pixels comprise:
    thin film transistors electrically connected to the signal lines; and
    pixel electrodes electrically connected to the thin film transistors,
    wherein each of the thin film transistors comprises:
        a gate electrode disposed on the first substrate;
        an active pattern overlapping the gate electrode;
        a source electrode disposed on the active pattern; and
        a drain electrode spaced apart from the source electrode and disposed on the active pattern, and
    wherein the anti-reflective layer is disposed between the gate electrode and the first substrate and is configured to reduce an amount of the light reflected from the gate electrode.

17. The display apparatus of claim 13, wherein the second auxiliary layer comprises aluminum oxide, tin oxide, and zinc oxide.

* * * * *